April 24, 1928.

W. D. TIPTON 1,667,228

ROTARY VALVE

Filed July 25, 1923

Inventor
William D. Tipton.

By Mason Fenwick & Lawrence
Attorneys

April 24, 1928.

W. D. TIPTON 1,667,228

ROTARY VALVE

Filed July 25, 1923 2 Sheets-Sheet 2

Inventor
William D. Tipton.

By Mason Fenwick & Lawrence
Attorneys

Patented Apr. 24, 1928.

1,667,228

UNITED STATES PATENT OFFICE.

WILLIAM D. TIPTON, OF BALTIMORE, MARYLAND.

ROTARY VALVE.

Application filed July 25, 1923. Serial No. 653,799.

This invention relates to improvements in rotary valves for internal combustion or steam engines and more particularly to the specific construction and arrangement of the several parts of the valve.

An object of the invention is to provide a suitable rotary valve for an internal combustion or steam engine which will be provided with a pair of spaced bypasses which function for both the exhaust and inlet.

Another object of the invention is to provide a rotary valve which will be formed with a pair of spaced shoes which will be slidably carried by the valve body and separated from each other by a pair of spaced bypasses.

A still further object of the invention is to provide a rotary valve for internal combustion or steam engines to be so positioned that it will receive a quantity of oil from the crank case of the engine to lubricate the same.

A still further object of the invention is to provide an improved rotary valve for internal combustion or steam engines which will be highly efficient in use and quite inexpensive to manufacture.

The other objects will appear as the description proceeds.

In the accompanying drawings which form a part of my application,

Like characters of reference are used throughout the following specification and the accompanying drawings to designate corresponding parts.

Figure 1:
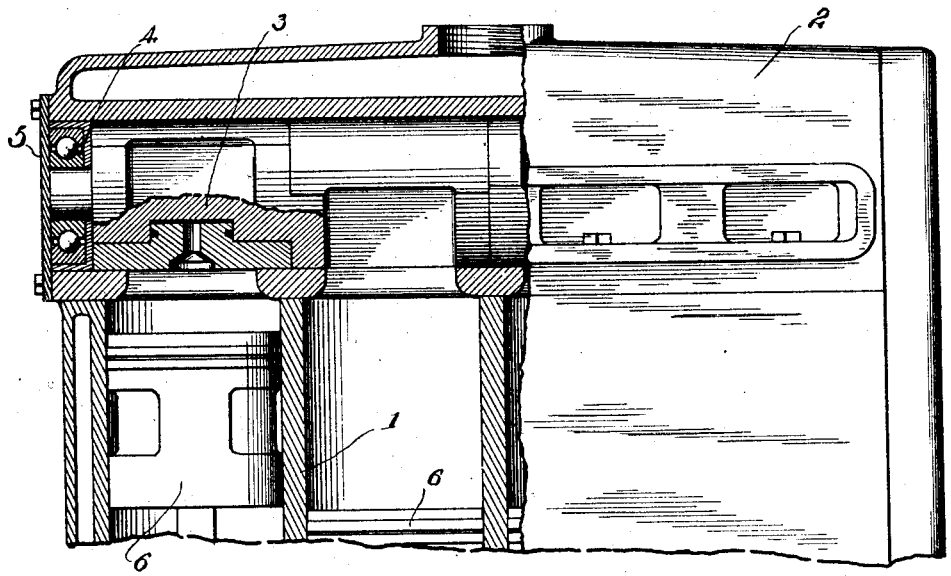
Fig. 1 is a side elevation partly in section of a portion of an internal combustion engine showing my improved rotary valve construction in operative position.
Figure 2:
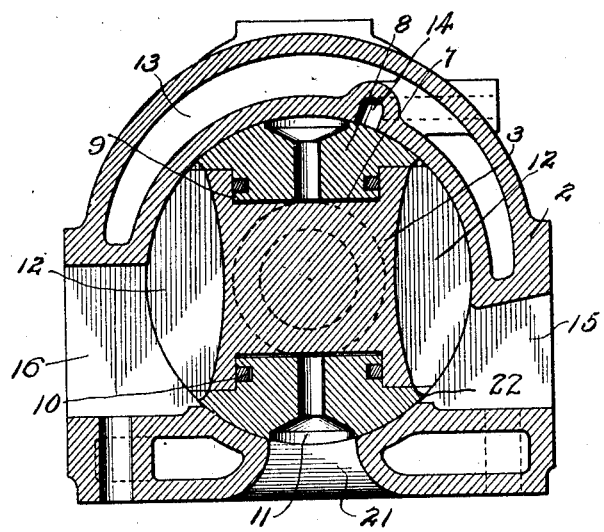
Fig. 2 is a transverse sectional view through the valve showing one of the valve shoes completely sealing the entrance to the cylinder.

The engine cylinders or block 1 is adapted to receive and support an integrally formed valve housing or head 2 in which will be positioned the rotary valve 3 which will be rotatably supported in the ball bearings 4. A suitable cover plate 5 is adapted to be secured to the end of the valve housing to hold the ball bearings or race 4 in position.

Pistons 6 are adapted to be positioned within cylinders 1 and to operate therein in the customary manner.

The body of the valve 3 is substantially rectangular in shape and is provided at two of its sides with the recesses 7 which are adapted to slidably receive the shoe members 8. These members 8 are provided with shank portions 9 which are of approximately the same size as the recesses 7. Packing rings 10 are positioned within annular recesses in the said shank portions 9 and are adapted to engage the circular wall of the recesses 7. Each shoe 8 is also provided with a port 11 which extends completely through it thereby registering, on the compression and expansion strokes, with the cylinder port 21. Bypasses 12 are formed at the opposite sides of the said valve and are spaced apart by the shoe members 8.

The valve housing 2 is provided with hollow channels 13 which are adapted to be filled with water for use in the cooling of the valve.

An oil duct 14 is positioned adjacent the top of the housing 2 and extends substantially the entire length of the valve and receives a suitable supply of oil from the crank case to properly lubricate the valve.

The inlet ports 15 and the exhaust ports 16 are formed at the opposite sides of said valve housing and cooperate with the valve for permitting the charges of combustion to enter from the intake to the cylinders and for permitting the exhaust gases to pass from the cylinders out through the exhaust port.

Figure 5:
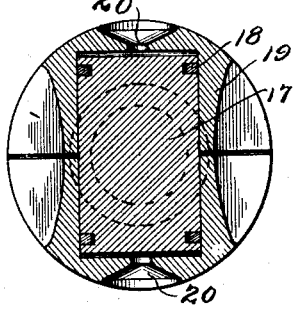

In Fig. 5 I have designated a slight modification of my invention which consists in having an integral valve portion 17 provided with packing rings 18 which engage the inner walls of the spaced shoe members 19. These shoe members 19 carry the pistons 20 and are held in position by engagement with the body portion 17 of the valve.

The action of the shoe members is as follows: On the compression and expansion strokes the port 11 through the shoe registers with the cylinder port 21 and allows the gas to pass in behind the shank portion of the shoe members and forces the said member behind the shoe member tightly against its side, thereby sealing the port. The valve being provided with two bypasses 11 which function for both the exhaust and inlet thereby necessitates the rotation of the valve at one-fourth of the speed of the engine. It will further be noted that in rotating the valve that a volume of inlet gas equal to the volume of the bypass is carried around with the valve to the exhaust port and there either ignited or carried away by the exhaust of the other cylinders.

Figure 3:
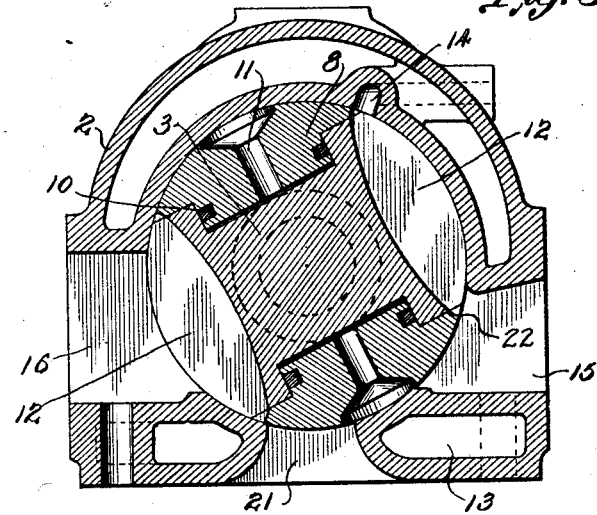
Fig. 3 is a transverse sectional view through the valve showing the same in position to draw in a small amount of lubricant for lubricating the valve.
Figure 4:
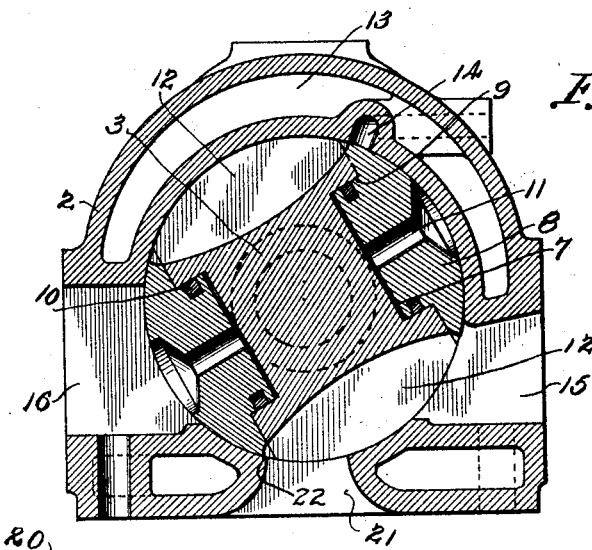
Fig. 4 is a transverse sectional view through the valve showing the same in such position as to permit the combustion charge to enter the inlet and pass into the cylinder; and, Fig. 5 is a transverse sectional view of a modification of my valve structure.

When the valve is in the position indicated in Fig. 3 of the drawings the oil mist for lubricating the said valve will be drawn from the crank case in sufficient quantity due to the suction furnished by the other cylinders, and this oil mist displaces the inlet gas which is present in the bypass, thereby saving the inlet gas which ordinarily would be wasted. Another feature of this design is that the bearing surface of the valve which makes contact with the valve housing, namely, the surface of a shoe, is at all times in contact with the wall of the housing and being provided with sharp leading edges designated by numeral 22 on the drawings, will remove all particles of carbon which might collect on the valve housing surface, and since no clearance therefore exists between the bearing surfaces of the valve and its housing, no carbon or dirt can get between these surfaces to cause scoring.

It will be understood that I do not intend to limit myself to the specific construction and arrangement of parts as described and claimed, as many minor changes in detail of description may be resorted to without departure from the spirit of the invention.

Having thus described my invention what I claim as new and desire to secure by Letters Patent of the United States is:—

1. In an internal combustion engine, in combination with the cylinder, a valve chamber having an inlet port, exhaust port and cylinder port, of a rotary valve positioned within said valve chamber, comprising a body portion provided with circular pockets, shoe members slidable radially mounted piston tight in the circular pockets of said body portion, the said shoe members having ports arranged to register with the cylinder port on the compression and expansion stroke of the engine.

2. In an internal combustion engine, in combination with the cylinder, a valve chamber having an inlet port, exhaust port and cylinder port, of a rotary valve positioned within said valve chamber, comprising a body portion provided with circular pockets, shoe members radially slidable mounted piston tight in the circular pockets of said body portion, the body portion and shoe members being in spaced relation whereby gas is allowed to pass in behind the shoe member forcing the said shoe member tightly against the inside circumference of the valve chamber, thereby positively sealing the port.

In testimony whereof I affix my signature.

WILLIAM D. TIPTON.